INVENTOR.
FRANK CHARLES WERNER
BY
ATTORNEYS

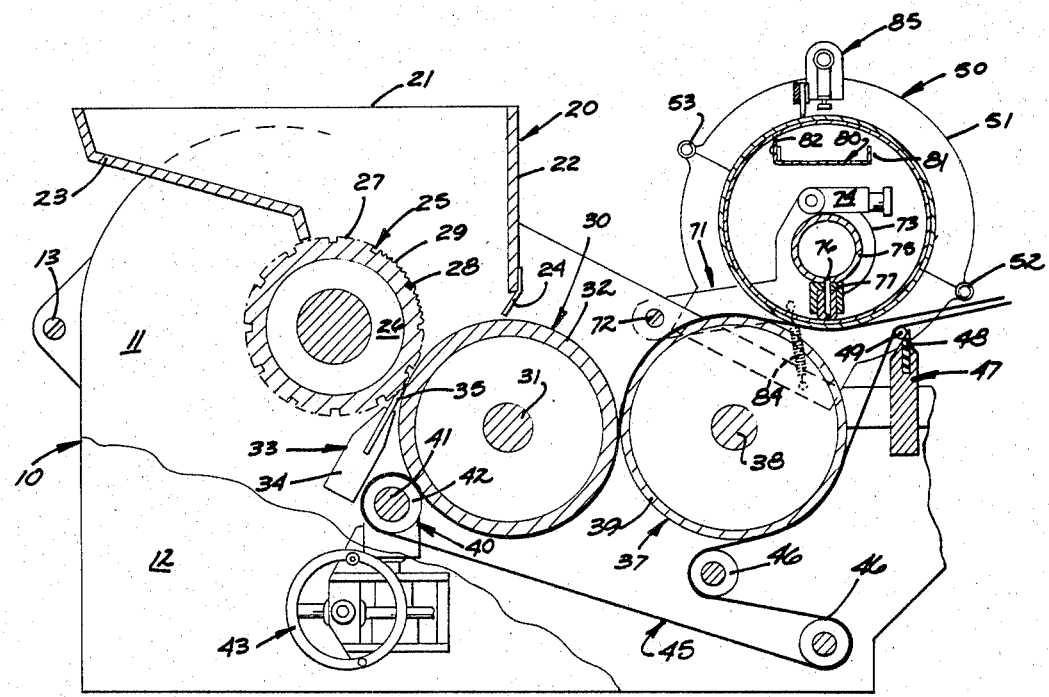

United States Patent Office 3,421,455
Patented Jan. 14, 1969

3,421,455
STENCILING APPARATUS
Frank Charles Werner, Grand Rapids, Mich., assignor to Werner Machinery Company, Grand Rapids, Mich., a corporation of Michigan
Filed May 5, 1967, Ser. No. 636,503
U.S. Cl. 107—1          8 Claims
Int. Cl. A23g 3/20; B05c 5/02; B05c 3/12

ABSTRACT OF THE DISCLOSURE

A rotary stenciling apparatus having a stencil roll rotatably mounted such that sequential sections of its periphery contact sequential sections of the conveyor belt upon which the goods to be stenciled are riding. The periphery of the stencil roll has a plurality of band-shaped recess areas through which the goods to be stenciled pass. The peripheral surface of each of the recesses has a series of groups of cuts which correspond to the desired stenciling pattern.

Mounted within the open interior of the stenciling drum is an elongated orifice into which the stenciling material is fed under pressure. The interior periphery of the stenciling drum contacts the tips of this orifice in a valve-like fashion and stenciling material issues therefrom only when one of the apertures passes thereunder. The orifice, of course, is held stationary and pointed toward the point of tangency of the conveyor belt with respect to the stenciling drum.

Background

This invention relates to a stenciling apparatus and more particularly, to a rotary stenciling apparatus adapted to stencil a predetermined configuration of material upon goods as they pass along a conveyor line without interrupting the continuous travel of the conveyor. In its more limited aspects, this invention relates to a stenciling apparatus adapted for integral mounting with a machine for forming dough-like material and adapted to stencil a predetermined pattern on the formed pieces of material as they travel along the machine conveyor.

Insofar as applicant is aware, no satisfactory apparatus has ever been built which is capable of stenciling a predetermined configuration or pattern of material upon goods passing along a conveyor line assembly without interrupting the travel of the goods and holding them motionless during the period in which they are being stenciled. The lack of such an apparatus has created many problems, particularly in the baking art, where a large number of items such as cookies are being continually produced by a dierolling type of machine. If, for example, it is desired to stencil an icing pattern on the top of the cookies, either prior or subsequent to the time that they are baked, it is necessary to transfer them to a separate conveyor apparatus or to intermittently interrupt the forming or baking of the cookies so that each row may be stenciled while it is stationary. The drawbacks of such a process are quite evident. If the cookies are transferred to separate and interruptible conveyor means prior to the time that the desired pattern is stenciled thereon, both workroom space and supervisory facilities must be furnished for the separate stenciling conveyor. If, on the other hand, it is attempted to stencil the desired pattern on the cookies while they are on the forming and production line, the conveyor must also be stopped within the forming or baking apparatus resulting, at best, in decreased production and, often, in a non-uniform product.

Objects and specification

It is an object of this invention to provide a stenciling apparatus whereby goods may be stenciled as they pass along a conveyor line without interrupting the movement of the conveyor.

More particularly, it is an object of this invention to provide a rotary stenciling apparatus whereby a predetermined pattern of material may be stenciled upon goods as they pass along a conveyor line without necessitating the removal of the goods from the conveyor belt upon which they are riding.

It is an object of this invention to provide a device of the type described wherein the goods passing along the conveyor belt will not be deformed or crushed by the stenciling apparatus.

It is an object of this invention to provide a device of the type described which may be mounted integrally with a forming machine for dough-like material and, thus, the stenciling operation performed with relatively small added expense to the overall operation.

It is an object of this invention to provide a device of the type described embodying a novel valve arrangement for selectively initiating and interrupting the flow of stenciling material through the rotary stencil.

These and other objects of this invention will be clearly understood by reference to the following specification and accompanying drawings in which:

FIG. 1 is a side-elevational view, partially in cross section, of a rotary cookie machine having the stenciling apparatus, which is the subject of this invention, mounted integrally thereon.

FIG. 2 is a broken, front-elevational view, partially in cross section, of the rotary stenciling drum, the planetary gear supports and the outer periphery scraping mechanism;

Figure 3:
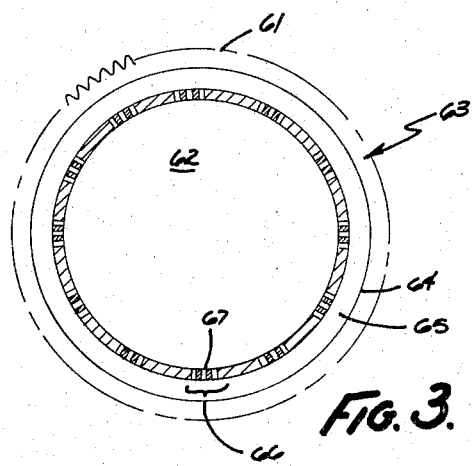
FIG. 3 is a fragmentary, cross section view taken along line III—III of FIG. 2.

Briefly, this invention comprises a rotary stenciling apparatus having a stencil roll rotatably mounted such that sequential sections of its periphery contact sequential sections of the conveyor belt upon which the goods to be stenciled are riding. The periphery of the stencil roll has a plurality of band-shaped land areas therearound for depressing the conveyor belt and a plurality of interspaced band-shaped recess areas through which the goods to be stenciled pass during the stenciling operation.

The peripheral surface of the band-shaped recesses each has a plurality of groups of apertures or cuts therein which correspond to the pattern desired to be stenciled upon the goods. These apertures or cuts pass completely through the stencil roll shell and open into the interior thereof. The spacing of the articles to be stenciled, the peripheral spacing of the groups of stenciling apertures and the speed of rotation of the stenciling drum are all interrelated such that a particular group of stenciling apertures passes over each article as it passes beneath the stenciling drum.

Referring now to the figures, a preferred embodiment of this invention will be described in detail. While this preferred embodiment is illustrated in a baking environment and, more particularly, as an integral component of a rotary cookie forming machine, the concepts set forth herein will find utility, as will be readily apparent to those skilled in the art, in many other fields, some of which are seemingly unrelated to the baking field. More particularly, the broader aspects of this invention are applicable in any situation where it is desirable to place material in stencil fashion onto goods passing along a conveyor belt without interrupting conveyor travel during each stenciling operation.

Referring initially to FIG. 1, there is shown a rotary cookie forming apparatus having a frame 10 composed of a pair of side walls 11 and 12 and suitable lateral supports 13. Positioned near the top of the apparatus between sidewalls 11 and 12 is the hopper assembly 20 which comprises a pair of side panels 21 a front panel 22 and a rear panel 23. Front panel 22 has a conventional dough container strip 24 extending downwardly therefrom and into abutment with the adjacent die roll assembly 30 such that dough will not migrate to undesirable areas of the apparatus.

Rotatably positioned within the mouth of hopper 20 is a feed roll assembly 25 comprising a shaft 26 and a shell 27 having a plurality of grooved islands 28 and separating channels 29 in its perpiheral surface. The feed roll 25 faces against the die roll assembly 30 which comprises a shaft 31 having a shell 32 rotatably mounted therearound. The shell 32 has a plurality of recesses in the outer periphery which are shaped in conformance with the desired cookie patterns to be produced (not shown). A scraping knife assembly 33 comprising a holder 34 and a blade 35 is positioned generally in the manner indicated for scraping excess dough from the outer periphery of the die roll so as to insure uniform cookie size.

An idler roll assembly 37 having a shaft 38 and a shell 39 is positioned forward of the die roll in nearly abutting relationship therewith. A pressure roll 40 having a shaft 41 and a shell 42 is positioned beneath the die roll in the manner shown and its vertical height with respect thereto may be varied by means of an adjustment assembly indicated generally by the reference numeral 43.

An endless conveyor belt is mounted about idler roll assembly 37, die roll assembly 30 and pressure roll assembly 40 in the manner indicated. Suitable idler rollers 46 which may be adjustable to compensate for positional changes of pressure roll 40 are positioned as shown. A guide assembly 47 having a scraper edge 48 and a slide 49 may be utilized conveniently on the return path of the belt to insure that no undesirable dough caking has occurred thereon during the previous sequence.

As will be readily apparent to those skilled in the art, means must be provided for adjusting the relative displacements of feed roll assembly 25 and die roll assembly 30 and for making positional adjustments of knife assembly 33. Suitable means for accomplishing these functions are shown in co-pending application Ser. No. 636,306, filed May 5, 1967 (Werner P-324), assigned to the same assignee as the instant invention. By way of brief explanation, the dough within hopper 20 is compacted into the shaping apertures in die roll assembly 30 by the feed roll assembly 25, the bottom surfaces thereof smoothed by knife assembly 33 and the cookies transferred from the die roll onto the conveyor belt 45. Usually, the cookies emerge in aligned rows and there may be 20 or 30 of these rows spread across the width of the conveyor belt 45. It is customary to assign to each band-like configuration of recesses in the die roll assembly 30 a partcularly cookie shape and, thus, cookies of differing shapes may be formed in the same operation.

Referring now additionally to FIGS. 2, 3, 4 and 5, the stencil roll assembly 50 comprises a pair of planetary gear enclosures 51 each adapted to be opened for receiving the sun gear 55 by means of a hinge 52 and a conventional latch 53. The planetary gear enclosures 51 each have a plurality of planetary gears 54 suitably journalled therein. As will be readily apparent, one or more of these planetary gears in each enclosure 51 is driven and the rotational thrust transferred therefrom to the stencil roll 60. The remainder of the planetary gears in each enclosure are utilized for rotational stabilization purposes. It has been found that three such planetary gears in each gear enclosure 51 will give satisfactory results.

The stencil roll or drum, indicated generally by the reference numeral 60, comprises a pair of sun gear extremities 61 affixed to each end of a cylindrical shell 63. The ends of the drum are open to form a cylindrical passageway 62 therethrough. The cylindrical shell section 63 of the roll 60 has a plurality of land bands 64 disposed perpendicularly about its periphery and these land bands form a plurality of alternate recess bands 65. Recess bands 65 each contain a plurality of stencil aperture groups 66 composed of individual apertures 67. Each of the apertures 67 communicates between the outer periphery of shell 63 and the interior periphery 68 thereof. Each of the stencil apertures 66 corresponds to an individual article to be stenciled and these groups may be of any desired physical configuration. For example, rather than the three longitudinal slots illustrated throughout the drawings, each of the groups might comprise a cutout figure or the like.

The sun gear extremities 61 of stencil roll 60 are adapted to be received by the planetary gear enclosures 51 on each side of the machine, as viewed best in FIG. 2. As noted previously, at least one of the planetary gears in each enclosure is driven such that the entire stencil roll assembly 60 rotates at a lineal peripheral speed equal to the speed of conveyor belt 45 against which the land bands 64 abut.

Figure 4:
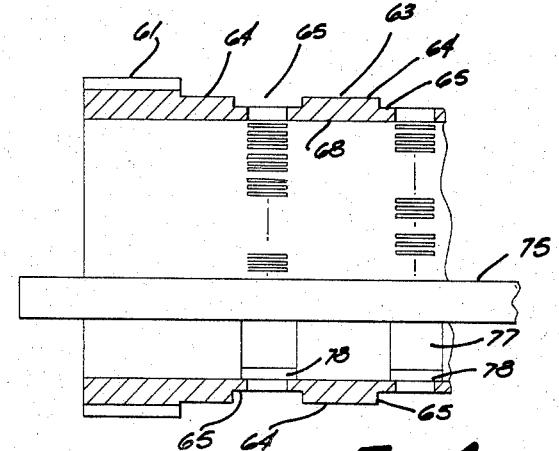
FIG. 4 is a fragmentary, front-elevational view, partially in cross section, of the rotary stenciling drum.
Figure 5:
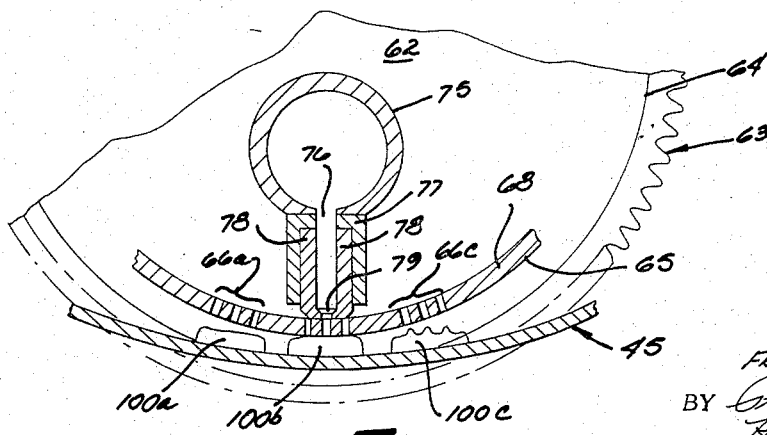
FIG. 5 is a side-elevational view, partially in cross section of the rotary stenciling machine, the elongated nozzle and the article carrying conveyor belt associated therewith.

The creamer assembly 70, as illustrated in FIGS. 1, 4 and 5, comprises a pair of brackets 71 pivotally mounted at 72 to the sidewalls 11 and 12 of the machine. Each of the brackets 71 has a clamp 73 at its outer extremity which is adapted to be opened and closed by means of a conventional locking mechanism 74.

Carried between clamps 73 is a supply pipe 75 which is closed at one of its extremities and affixed to a pressurized source of stenciling fluid at the other extremity. Pipe 75 has a plurality of longitudinal slots 76 positioned above each of the recess bands 65. An orifice support 77 which houses a pair of converging nozzle members 78 is affixed to pipe 75 at each of these slots. The icing or other material forced into pipe 78 under pressure flows through the slots 76 and into the space between each pair of nozzle members 78. The entire creamer assembly is biased about pivot point 72 by means of a pair of springs 84 attached to each of the brackets 71 and to the sides 11 and 12 of the apparatus. This causes the drum abutting extremities of nozzle members 78 to abut the interior periphery of the drum in sealing fashion but allows the drum to rotate with respect thereto. Each time one of the stenciling apertures 67 passes beneath the discharge orifice 79 of the creamer assembly, the pressurized cream or icings are allowed to flow thereinto. As the drum 60 rotates further, orifice 79 will again be sealed by its abutment with the non-perforate section of the inner periphery of drum 60.

As a means of preventing the buildup of cream and the like on the interior and exterior surfaces of the stencil roll 60, an inner peripheral scraping assembly 80 comprising an elongated box 81 and a scraper blade abutting the interior surface of the stencil drum 60 is provided. Box 81 may be supported at either of its ends by any convenient means. As will be readily apparent, as the drum rotates, its inner peripheral sections are sequentially contacted by knife 82 and any material which has deposited or caked thereon is scraped away and falls into collection box 81. This box must be removed, of course, periodically for cleaning.

Similarly, the outer peripheral scraping assembly 85 comprises a pair of upstanding shoulders 86 affixed to the facing surfaces of gear retainers 51 to which are pivotably mounted, by means of shafts 87, a pair of pivotable supports 88. Pivotable supports 88 may be positively positioned with respect to shafts 87 by means of a pair of conventional spring pins 89. Suspended between pivotable supports 88 is a knife carrier 90 having a plurality of sectionalized blades 91 affixed thereto and positioned such that, when pivotable support members 88 are in the position shown in FIG. 1, they abut and scrape against the peripheral surfaces of each of the recess bands 65 and, thus, scrape any accumulated creaming material therefrom.

In operation, as the forming section of the apparatus is activated, the cutout cookie forms appears on conveyor belt 45 in aligned rows. The lateral spacing of the die-recessed bands on the die roll and the channel-like recessed bands on the stencil roll is equal such that each line of cookies passes into a predetermined channel-like recess 65 in the periphery of drum 60 as indicated at FIG. 2.

The peripheral spacings of the groups 66 of stenciling apertures 67 is predetermined such that one group will appear above each of the cookies 100 as they pass beneath the stencil roll 60 on conveyor belt 45. More particularly, as viewed in FIGS. 4 and 5, the discharge orifices 79 of the creaming assembly 70 remain stationary and the conveyor belt 45 and stenciling drum 63 move at identical lineal speeds. As a particular cookie 100a approaches a position directly beneath the creamer assembly, it comes into registry with a stencil grouping 66a. As the cookie passes into the position designated by the reference numeral 100b, its associated stenciling aperture group passes sequentially beneath orifice 79 of creamer assembly 70 and the cream is forced by the pressure existing at pipe 75 through slot 76 into the individual stenciling apertures 67. As the drum 60 rotates, each succeeding slot 67 of a particular group passes beneath the orifice 79 and is filled with cream. When the cookie is moved to the position indicated by the reference numeral 100c, its associated group of stenciling apertures 66c begins to recede and the cream sticks to the cookie in the pattern predetermined by the configuration of the stenciling group 66. The cookie then passes along on conveyor belt 45 to be processed further. During the time that the line of cookies is passing through a particular channel-like recess 65, the land areas 64 on each side thereof depress the belt 45 to insure that the cookie will not be crushed between the belt and the periphery of stencil roll 60. When orifices 79 are not riding over a stenciling aperture 67, their abutment against the smooth inner periphery of the drum 60 prevents the flow of cream therefrom in valve-like fashion. Each time, however, that an aperture passes beneath the orifice, cream will issue therefrom to be deposited onto one of the cookies.

If desired, the drum 60 may be fabricated in interchangeable sections so as to permit changing of stenciling patterns without necessitating the replacement of the entire roll assembly. Ordinarily, each of the groups in a particular channel-like recess will be identical but, as will be apparent to those skilled in the art, this too may be varied in accordance with the particular types of goods being produced.

As the apparatus is operating and cookies are continually being produced and stenciled, any creaming material deposited upon the inner or outer peripheries of drum 60 is removed by the knife assemblies 80 and 85. The entire stenciling drum 60 may be removed for more thorough cleaning by releasing pipe 75 from clamps 73, releasing the latches 53 on the planetary gear enclosures 51 and rotating the upper sections thereof about hinges 52. Another drum may be immediately reinserted so that production is not discontinued for an appreciable period of time or so that a new stenciling pattern may be initiated.

Should an undesirable quantity of dried creaming material accumulate against the scraping surface of outer peripheral knife assembly 85, it may be removed therefrom by depressing spring pins 89, pivoting knife holder 85 in a clockwise direction as viewed in FIG. 1, and cleaning away the material. The knife may then be returned to its working position and production continued.

It will be apparent to those skilled in the art that the preferred embodiment of this invention which has been set forth in detail is subject to numerous modifications without necessitating a departure from the spirit and scope of this specification and the accompanying drawings. Such modifications are to be deemed as included within the scope of the following claims unless these claims, by their language, expressly state otherwise.

I claim:
1. In a rotary machine for shaping and processing dough-like material having a die roll, a feed roll for compacting said dough-like material into the recesses in said die roll and an endless conveyor belt adapted to receive said formed material from said die roll in a series of aligned formations, the improvement comprising: a stencil roll rotatably mounted such that sequential sections of its periphery having a plurality of band-shaped channel-like recesses therearound within which said aligned formations of formed material pass; a plurality of stencil apertures positioned within said recesses; and, means for forcing a processing fluid through said apertures and onto said formed materials as they pass in alignment with said stencil apertures.

2. The apparatus as set forth in claim 1 wherein said forcing means comprises: an orifice positioned within said roll having its outer boundaries contacting the inner periphery thereof to form a valve which is closed when the abutting inner peripheral section contains no stencil aperture but is open when said abutting inner peripheral section does contain a stencil aperture; and means for transporting pressurized processing fluid to the interior of said orifice whereby it passes into said stencil apertures as they pass in communication therewith.

3. The apparatus as set forth in claim 2 wherein said roll is open at both ends and wherein said transporting means comprises a conduit passing therethrough having an aperture therein communicating with the interior of said orifice, said conduit and the orifice affixed thereto being stationary as said roll rotates.

4. Apparatus for stenciling a predetermined pattern of processing fluid upon articles passing along a conveyor band, said apparatus comprising:

a stencil drum rotatably mounted adjacent said conveyor band about an axis perpendicular to the path of travel thereof, the periphery of said drum contacting said conveyor band except for a channel-like recess therearound through which said articles pass as they are moved along by said conveyor band;

a plurality of stencil apertures in the recessed periphery of said channel-like recess, said apertures communicating between said recessed periphery and the interior of said drum; and means mounted within said drum for passing said processing fluid through said apertures when they are positioned in alignment with said articles.

5. The apparatus as set forth in claim 4 wherein said goods are positioned on said conveyor band in aligned formation, one said channel-like recess being provided for each said alignment formation, the depth of said channel-like recess being equal to or greater than the height of said articles whereby said articles will not be crushed as they pass adjacent said drum.

6. The apparatus as set forth in claim 5 wherein said passing means comprises orifice means abutting the inner periphery of said drum opposite each of said channel-like recesses, said orifice means having wall means cooperative with the interior periphery of said drum to prevent flow of said material out of said orifice means except when one of said stenciling apertures passes thereunder; and means for supplying said material to said orifice means.

7. The combination as set forth in claim 6 wherein said supplying means comprises a conduit passing through the interior of said drum and having at least one aperture therein communicating with the interior of said orifice means; and means for supplying said material to said conduit.

8. The combination as set forth in claim 6 wherein said drum has a sun gear periphery at each extremity thereof and wherein it is rotatably mounted above said conveyor band by means of a pair of planetary gear housings having sun gear meshing planetary gears mounted therein, each of said housings being adapted to be separated whereby said drum may be removed for cleaning or replacement.

References Cited

UNITED STATES PATENTS

| | | | |
|---|---|---|---|
| 3,050,017 | 8/1962 | Mähler | 107—1 |
| 3,119,352 | 1/1964 | Fay | 107—1 |
| 3,215,093 | 11/1965 | McKown et al. | 107—1 |
| 3,340,824 | 9/1967 | Talbot | 107—1 |

WALTER A. SCHEEL, *Primary Examiner.*

ARTHUR O. HENDERSON, *Assistant Examiner.*

U.S. Cl. X.R.

118—24, 411